(12) United States Patent
Rosenberger

(10) Patent No.: US 7,849,500 B2
(45) Date of Patent: *Dec. 7, 2010

(54) SYSTEM AND METHOD FOR WIRELESS LOCAL AREA NETWORK MONITORING AND INTRUSION DETECTION

(75) Inventor: Joel Rosenberger, Fall City, WA (US)

(73) Assignee: WiMetrics Corporation, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/236,357

(22) Filed: Sep. 23, 2008

(65) Prior Publication Data

US 2009/0019531 A1    Jan. 15, 2009

Related U.S. Application Data

(63) Continuation of application No. 11/847,228, filed on Aug. 29, 2007, now Pat. No. 7,448,073, which is a continuation of application No. 10/669,124, filed on Sep. 23, 2003, now Pat. No. 7,340,768.

(60) Provisional application No. 60/412,965, filed on Sep. 23, 2002.

(51) Int. Cl.
G06F 21/20 (2006.01)
G06F 15/16 (2006.01)
H04L 9/00 (2006.01)

(52) U.S. Cl. ............................................. 726/4; 726/22
(58) Field of Classification Search ........................ None
See application file for complete search history.

(56) References Cited

U.S. PATENT DOCUMENTS

| | | |
|---|---|---|
| 6,279,113 B1 | 8/2001 | Vaidya |
| 6,408,391 B1 | 6/2002 | Huff |
| 6,560,611 B1 | 5/2003 | Nine |
| 6,754,488 B1 | 6/2004 | Won |

(Continued)

FOREIGN PATENT DOCUMENTS

EP    1039689 A2    9/2000

(Continued)

OTHER PUBLICATIONS

Asaka, M., "Information Gathering With Mobile Agents for an Intrusion Detection System," Systems and Computers in Japan 30(2):31-37, 1999.

(Continued)

*Primary Examiner*—Christopher A Revak
(74) *Attorney, Agent, or Firm*—Knobbe Martens Olson & Bear LLP

(57) ABSTRACT

Systems and methods for providing improved network security against unauthorized wireless devices are presented. A security component within in a wired portion of a computer network is provided. The security component is configured to control the bridging of network activity between the wireless portion and wired portion of the computer network. Using the security component, network traffic between the wireless and wired portions of the computer network for unknown wireless devices is passively monitored. Upon network traffic between the wireless and wired portions of the computer network for an unknown wireless device, the security component determines at least one identifying characteristic of the unknown wireless device by actively probing the device for an identifying characteristic. The security component determines at least one behavioral characteristic of the device according to the network traffic between the device and devices in the wired portion of the computer network. A device profile for the unknown wireless device is generated according to the identifying and behavioral characteristics, access privileges corresponding to the unknown wireless device according to the device profile are determined, and network traffic from the unknown wireless device is permitted to pass to the computer network according to the determined access privileges.

2 Claims, 11 Drawing Sheets

U.S. PATENT DOCUMENTS

| | | | |
|---|---|---|---|
| 7,020,476 B2 | 3/2006 | Day | |
| 7,042,852 B2* | 5/2006 | Hrastar | 370/310 |
| 7,058,796 B2* | 6/2006 | Lynn et al. | 713/1 |
| 7,068,998 B2 | 6/2006 | Zavidniak | |
| 7,069,438 B2 | 6/2006 | Balabine | |
| 7,086,089 B2* | 8/2006 | Hrastar et al. | 726/22 |
| 7,257,107 B2* | 8/2007 | Swier et al. | 370/338 |
| 7,277,404 B2* | 10/2007 | Tanzella et al. | 370/310 |
| 7,295,524 B1 | 11/2007 | Gray | |
| 7,322,044 B2* | 1/2008 | Hrastar | 726/22 |
| 7,324,804 B2* | 1/2008 | Hrastar et al. | 455/410 |
| 7,340,768 B2* | 3/2008 | Rosenberger | 726/4 |
| 7,355,996 B2* | 4/2008 | Hrastar | 370/328 |
| 7,359,676 B2* | 4/2008 | Hrastar | 455/67.11 |
| 7,383,577 B2* | 6/2008 | Hrastar et al. | 726/23 |
| 7,448,073 B2* | 11/2008 | Rosenberger | 726/4 |
| 7,522,908 B2* | 4/2009 | Hrastar | 455/411 |
| 7,526,808 B2* | 4/2009 | Lynn et al. | 726/23 |
| 7,532,895 B2* | 5/2009 | Hrastar | 455/456.1 |
| 7,577,424 B2* | 8/2009 | Sinha et al. | 455/410 |
| 2003/0120934 A1 | 6/2003 | Ortiz | |
| 2003/0217283 A1 | 11/2003 | Hrastar | |
| 2003/0217289 A1 | 11/2003 | Ammon | |
| 2004/0003285 A1 | 1/2004 | Whelan | |
| 2004/0008652 A1 | 1/2004 | Tanzella | |
| 2004/0034773 A1 | 2/2004 | Balabine | |
| 2004/0098610 A1 | 5/2004 | Hrastar | |
| 2004/0121787 A1 | 6/2004 | Day | |
| 2004/0157624 A1 | 8/2004 | Hrastar | |
| 2004/0209634 A1 | 10/2004 | Hrastar | |
| 2004/0210654 A1 | 10/2004 | Hrastar | |
| 2004/0215957 A1 | 10/2004 | Moineau | |
| 2004/0252837 A1 | 12/2004 | Harvey | |

FOREIGN PATENT DOCUMENTS

| | | | |
|---|---|---|---|
| EP | 1760611 A1 | 3/2007 | |
| WO | 00/34867 A1 | 6/2000 | |
| WO | 00/70458 A1 | 11/2000 | |
| WO | 01/71499 A1 | 9/2001 | |
| WO | 02/082730 A1 | 10/2002 | |
| WO | 03/100559 A2 | 12/2003 | |
| WO | 2004/017552 A2 | 2/2004 | |
| WO | 2004/062160 A2 | 7/2004 | |
| WO | 2004/092925 A2 | 10/2004 | |
| WO | 2004/095192 A2 | 11/2004 | |
| WO | 2005/024598 A2 | 3/2005 | |

OTHER PUBLICATIONS

Denning, D.E., "An Intrusion-Detection Model," IEEE Transactions on Software Engineering SE-13(2):222-232, Feb. 1987.

Goan, T., "A Cop on the Beat: Collecting and Appraising Intrusion," Communications of the ACM 42(7):46-52, Jul. 1999.

Kluepfel, H.M., "Foiling the Wiley Hacker: More Than Analysis and Containment," Proceedings of the Annual IEEE International Carnahan Conference on Security Technology (1989 ICCST), Zurich, Oct. 3-5, 1989, pp. 15-21.

Labuschagne, L., and J.H.P. Eloff, "The Use of Real-Time Risk Analysis to Enable Dynamic Activation of Countermeasures," Computers & Security 17(4):347-357, 1998.

Lin, L.-M., "A Case Study on Hunting a Brilliant Hacker," Proceeding of the 25th Annual IEEE International Conference on Security Technolgy, Taipei, Oct. 1-3, 1991, pp. 177-180.

McKosky, R.A., and S.G. Shiva, "A File Integrity Checking System to Detect and Recover From Program Modification Attacks in Multi-User Computer Systems," Computers & Security 9(5):431-446, 1990.

Snapp, S.R., et al., "DIDS (Distribution Intrusion Detection System): Motivation, Architecture, and an Early Prototype," Proceedings of the 14th National Computer Security Conference, Washington, D.C., Oct. 1991, pp. 167-176, <http://seclab.cs.ucdavis.edu/papers/DIDS.ncsc91.pdf>.

Stoll, C., "Stalking the Wily Hacker," Communications of the ACM 31(5):484-497, May 1988.

* cited by examiner

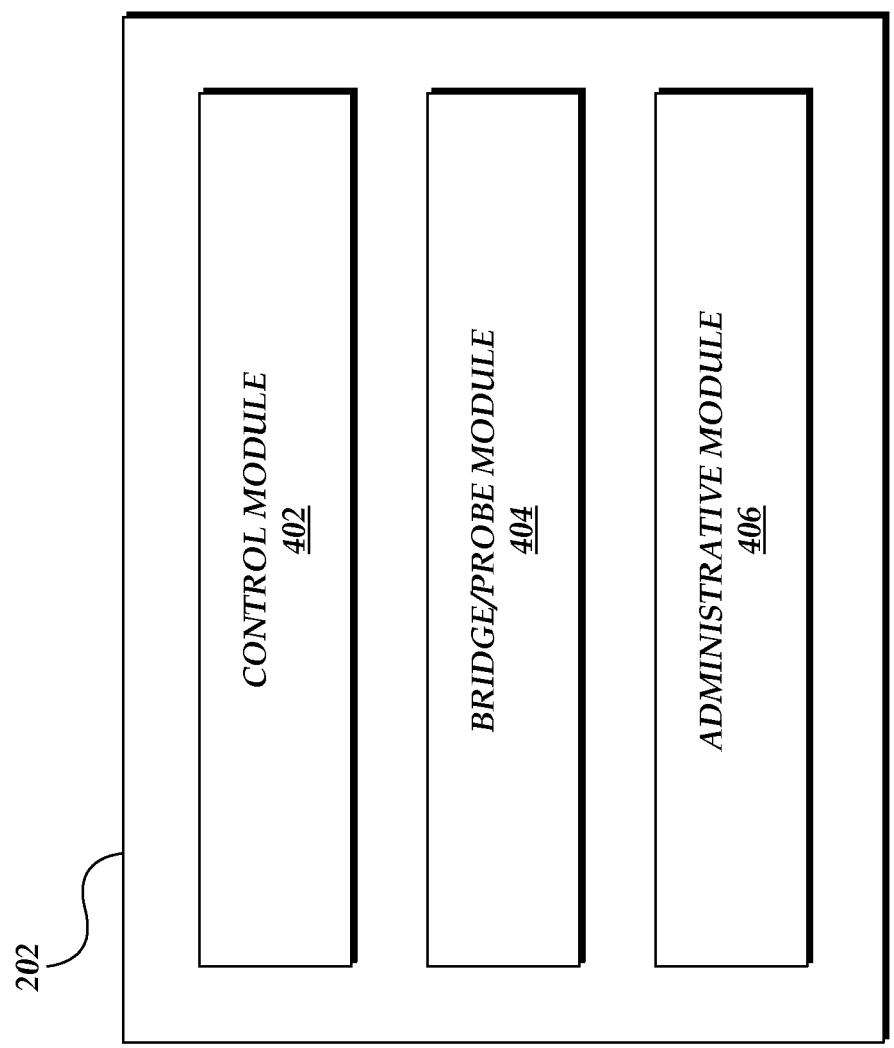

SYSTEM AND METHOD FOR WIRELESS LOCAL AREA NETWORK MONITORING AND INTRUSION DETECTION

CROSS-REFERENCES TO RELATED APPLICATIONS

This application is a continuation of U.S. patent application Ser. No. 11/847,228, filed Aug. 29, 2007, now U.S. Pat. No. 7,448,073, which is a continuation of U.S. patent application Ser. No. 10/669,124, filed Sep. 23, 2003, now U.S. Pat. No. 7,340,768, which claims the benefit of U.S. Provisional Patent Application No. 60/412,965, filed Sep. 23, 2002, each of which is incorporated herein by reference.

BACKGROUND

Wireless network communications have become increasingly widespread and popular, especially with the advent of IEEE 802.11-based networks and devices. The convenience afforded to computer users, especially those with portable computers, to be connected to a network without a physical, wired connection is just one of the factors driving this popularity. It is a simple exercise to add a wireless networking to an existing, wired network. For example, simply connecting a wireless access point, i.e., a transceiver that connects wireless devices to a wired network, to a network outlet allows wireless devices to access the network.

Unfortunately, when a wireless access point is connected to a network, that network becomes exposed to the "public" airwaves. While with wired networks a physical connection controls at least where a device can connect to the network, with wireless connections there is currently no effective way to control which wireless device, or where a wireless device, connects to the network. Because a wireless device has no physical connection to the network, even identifying it and its user as a legitimate part of the network is difficult. Thus, it is therefore relatively easy for a network to be compromised via a wireless connection. Clearly, wireless networks represent a serious network security problem.

In light of the convenience of wireless networking, as well as the security risks it represents, there is a need to effectively monitor for, identify and/or detect, and deal with security breaches posed to a network by users through wireless access points. The present invention addresses these and other issues found in the prior art.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for managing network traffic from an unknown wireless device on a computer network is presented. A security component residing in a wired area of the computer network is provided. The security component is configured to passively monitor network traffic from a wireless area of the computer network for network traffic from an unknown wireless device. Upon detecting network traffic from an unknown wireless device, the security component probes the unknown wireless device to determine at least one characteristic of the wireless device. After probing the device, the security component generates a device profile of the unknown wireless device according to the at least one determined characteristic. Access privileges are determined to give to the unknown wireless device according to the determined profile and activities exhibited by the wireless device. Thereafter, network traffic from the unknown wireless device is permitted to pass to the computer network according to the determined access privileges.

A method for detecting managing network traffic from an unknown wireless device on a computer network is presented. The method comprises the following steps, including passively monitoring for network traffic from a wireless area of the computer network for network traffic of an unknown wireless device. Upon detecting network traffic from the unknown wireless device, the unknown wireless device is probed to determine at least one characteristic of the wireless device. A device profile of the unknown wireless device is generated according to the at least one determined characteristic. Access privileges to give to the unknown wireless device are determined according to the determined profile and the activities exhibited by the wireless device. Thereafter, the network traffic from the unknown wireless device is permitted to pass to the computer network according to the determined access privileges.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrating exemplary components of a wireless security module in accordance with aspects of the present invention;

DETAILED DESCRIPTION

Figure 1A:
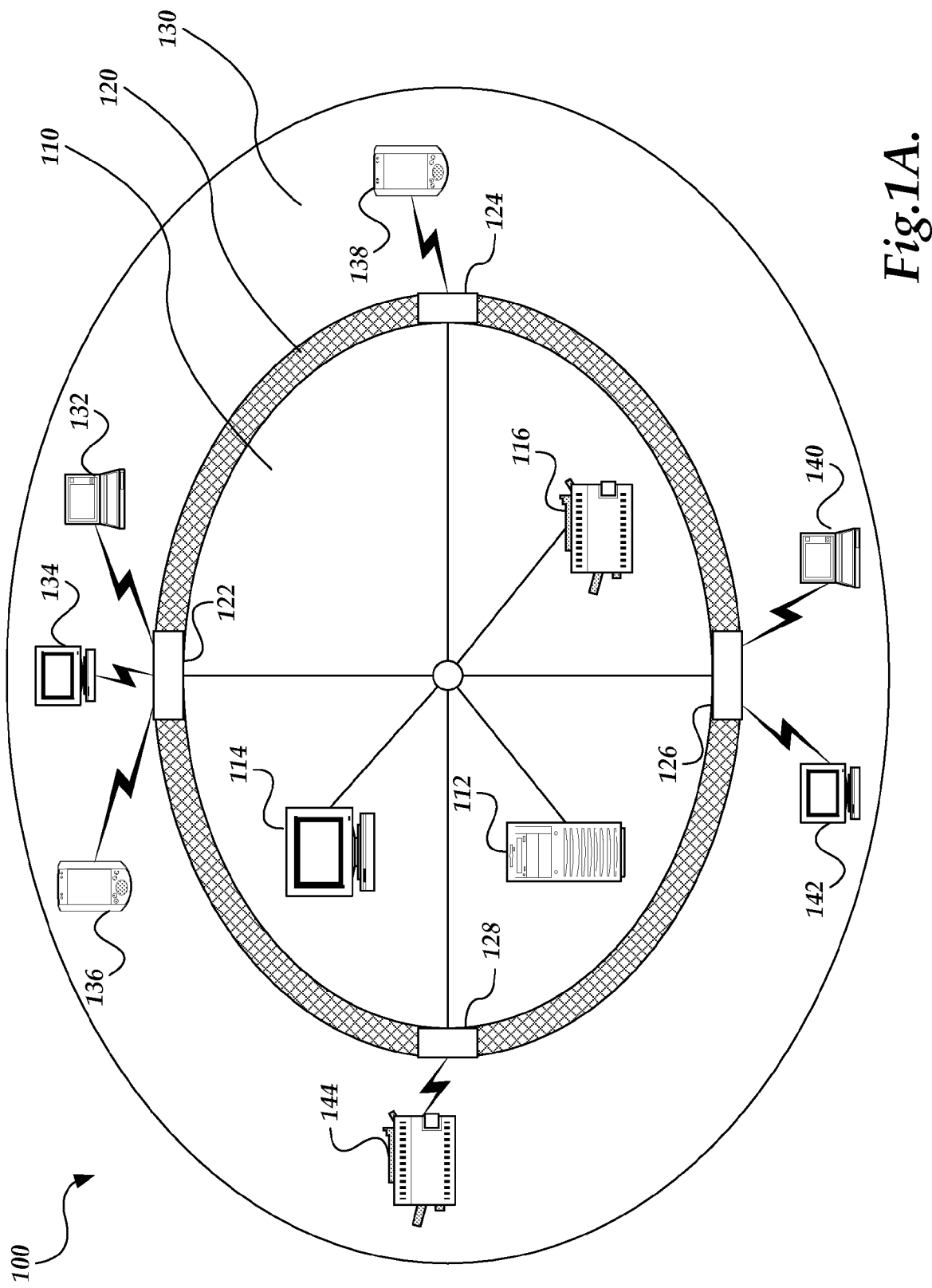
FIGS. 1A and 1B are pictorial diagrams illustrating exemplary prior art computer networks including both wired and wireless aspects.

FIG. 1A is a block diagram illustrating an exemplary, prior art computer network 100, including both wired and wireless aspects. For illustration purposes, the exemplary computer network 100 is illustrated as concentric layers, but such configuration should not be construed as limiting upon the present invention. As shown in the exemplary computer network 100, at the innermost layer is a wired network zone 110, wherein devices are interconnected via a physical wired connection. Wired networks are well known in the art and devices typically connected to a wired network may include mini- and mainframe computers (such as mini-computer 112), workstations (such as workstation 114), file servers, printers (such as printer 116), and the like.

The layer adjacent to the wired network zone 110 is the network bridge zone 120. The network bridge zone 120 includes the devices and processes that connect, or bridge, the wired network zone 110 to the outermost layer, the wireless network zone 130. The network bridge zone 120 is a logical, or conceptual area, representing the disconnect between the physical, wired network zone 110, and the wireless network zone 130. Included in the network bridge zone 120 are wireless access points, such as wireless access points 122, 124, 126, and 128. As mentioned above, wireless access points represent devices that bridge the disconnect between the wired network zone 110 and wireless network zone 130. The wireless network zone 130 may, but is not required to, contain any number of wireless devices limited only by the capacity of the wireless access points. As shown in FIG. 1A, wireless devices may include, but are not limited to, workstations, such as workstations 134 and 142, laptop computers, such as laptops 132 and 140, handheld computing devices (also referred to as personal digital assistants, or "PDAs"), such as PDAs 136 and 138, printers, such as printer 144, and the like. These wireless devices may communicate with the wireless access points, such as wireless access points 122, 124, 126, and 128, using any number of wireless communication protocols/technologies, including Bluetooth, IEEE 802.11-based protocols, ultra-wideband ("UWB") radio frequency, and the like.

As discussed above, typically when a wireless access point, such as wireless point 122, is connected to the wired network zone 110, the entire computer network 100 is exposed to a substantial security risk from unauthorized intruders. However, aspects of the present invention provide the functionality to monitor for, identify or detect, and manage unauthorized access via wireless devices.

While the following discussion of the present invention is primarily focused on monitoring for, identifying, and dealing with intrusions from wireless devices, such as wireless computing devices, as well as the addition of unauthorized wireless access points to the network, the same principles can be applied to unauthorized wired devices or bridges residing completely within a wired network zone 110. For example, it may be advantageous to provide a secure wired, sub-network within an existing network, such as a sub-network corresponding to a secured conference facility. According to the present invention, network traffic on the bridges and routers that connect the sub-network to the remainder of the wired network may be passively monitored. Upon detecting network traffic originating from an unknown wired device attempting to access devices within the sub-network, the present invention may intercede and prevent delivery of the network traffic. Thus, while the following discussion is primarily focused on wireless network management, the present invention should not be construed as limited to wireless network management.

Figure 1B:
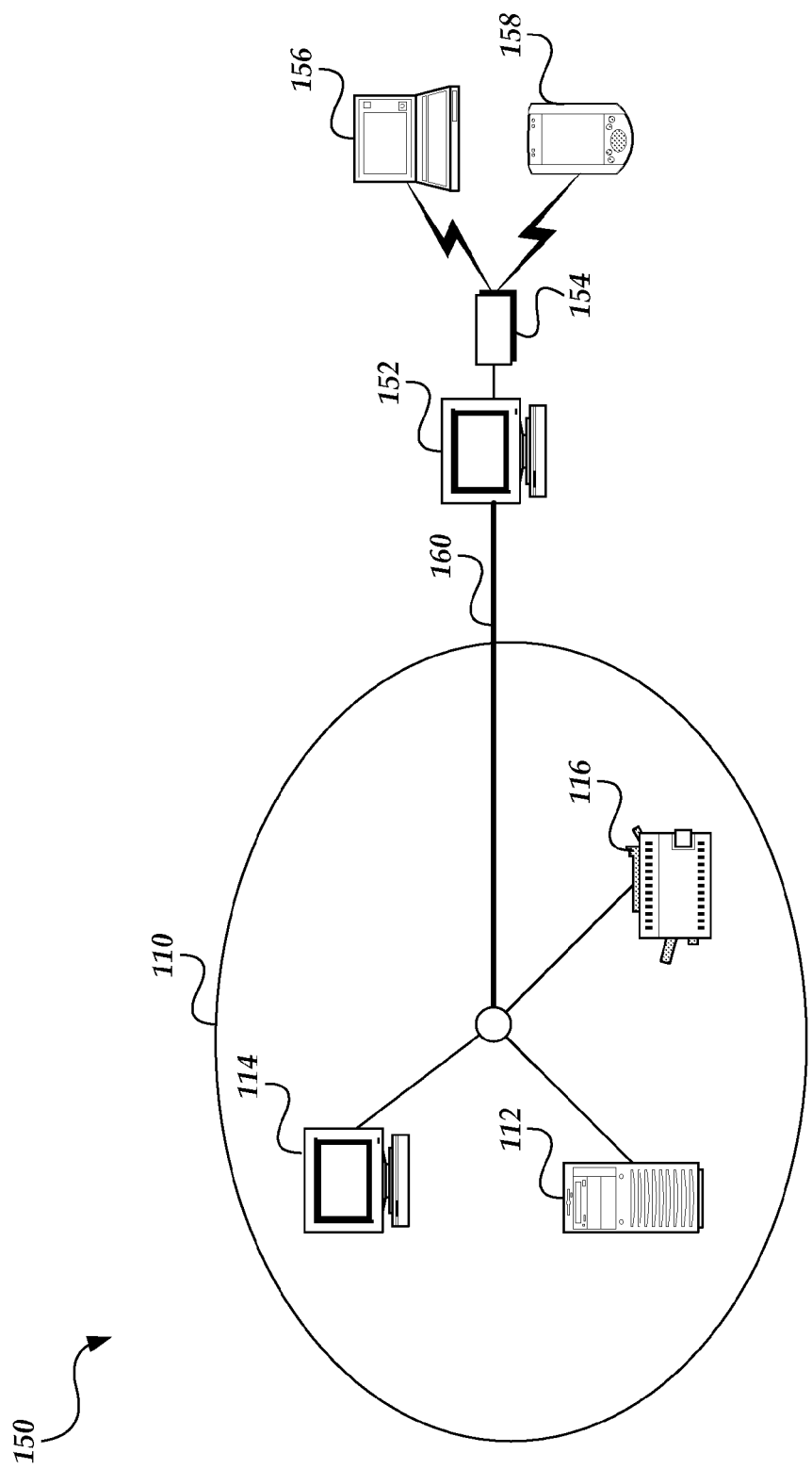

FIG. 1B is a block diagram illustrating an alternative, prior art computer network 150, including both wired and wireless aspects. As with the computer network of FIG. 1A, the exemplary computer network 150 shown in FIG. 1B includes the wired network zone 110, having wired devices such as the workstation 114, the mini-computer 112, and the printer 116. Other elements described in FIG. 1B, such as the wireless network zone 130, may also be included in this exemplary computer network 150, but, for illustration purposes, are not shown.

Frequently, especially with corporations, a person will need to communicate with a wired network from a remote location, such as when a worker must work from home. In such circumstances, a properly secured wired network will include a firewall, and will permit remote users to communicate with the network 150 via a virtual private network ("VPN"), such as the VPN 160 of FIG. 1B connecting the home workstation 152 with the wired network zone 110. However, while a VPN 160 adequately secures the connection between the home workstation 152 and the network 110, the VPN does not prevent the home computer user from adding a wireless access point 154 to the home workstation. Additionally, most operating systems, when they detect that another network connection is available, begin bridging network traffic between the two. Thus, in this manner, the wired network zone 110 becomes opened to other wireless devices, such as laptop 156 and PDA 158, all through the "secured" VPN 160 connection.

Figure 2:
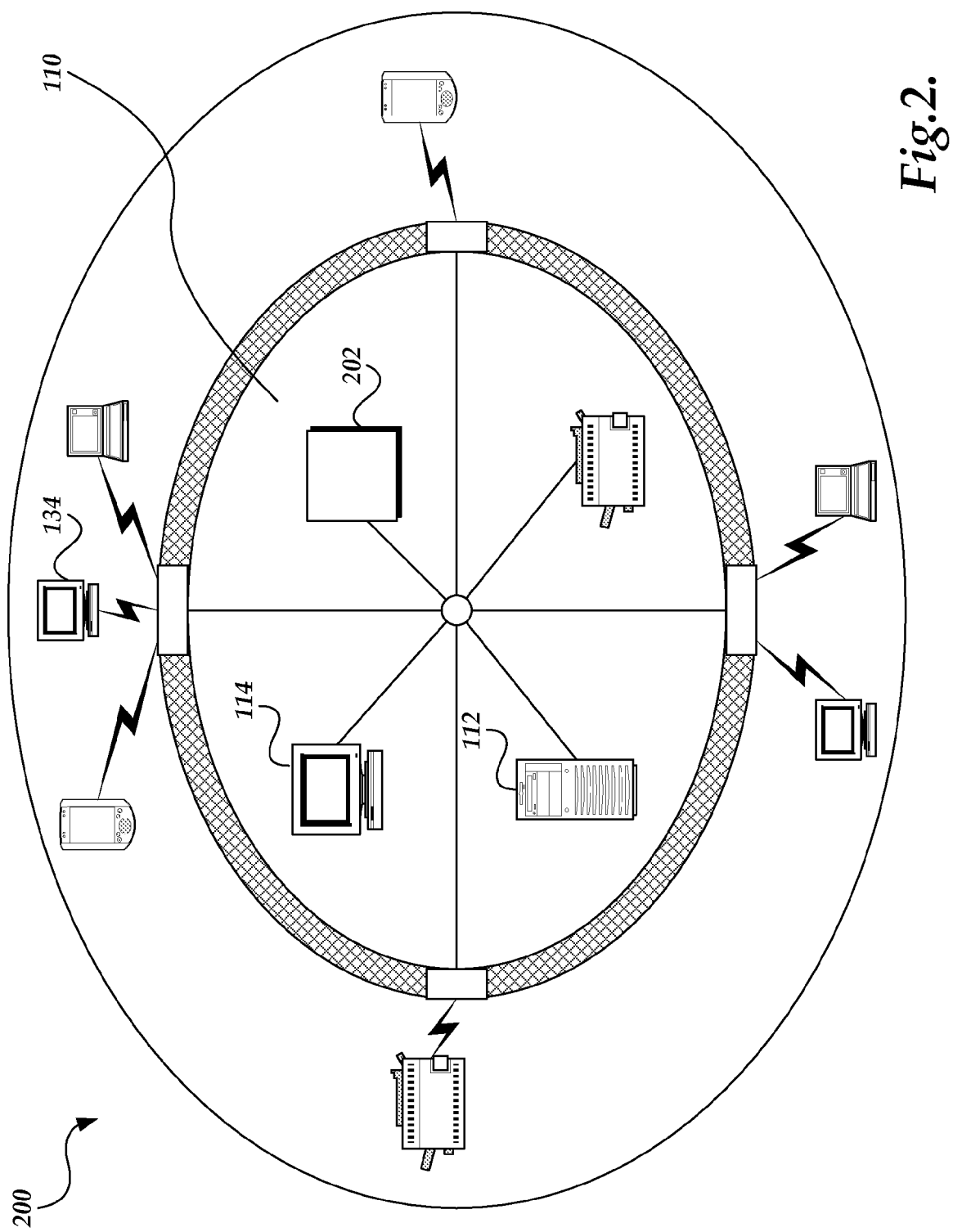
FIG. 2 is a pictorial diagram illustrating an exemplary computer network adapted in accordance with aspects of the present invention.

In order to secure a computer network from the security risks posed by wireless devices, the present invention adds a wireless security module to identify, even terminate, such security risks. FIG. 2 is a pictorial diagram illustrating an exemplary computer network 200, adapted in accordance with aspects of the present invention. As illustrated, the exemplary secure computer network 200 includes those components and network zones described above in regard to FIG. 1A, as well as an additional component, the wireless security module 202. By adding the wireless security module 202 to the network 200, wireless devices, including wireless computing devices and wireless access points, can be detected and managed in an efficient, passive manner.

As illustrated in FIG. 2, the present invention, specifically the wireless security module 202, may operate entirely within the wired network zone 110. However, the present invention is not so limited: various aspects of the invention may be carried out upon, or implemented on, wireless computing devices, such as workstation 134. Further, it should be appreciated that the present invention does not require or use non-standard, or modified, wired or wireless communication protocols to detect and manage intrusions from unauthorized wireless devices. Still further, the present invention is not required to use any specifically adapted communication hardware, though, as will be discussed below, it may be beneficial in some circumstances where applicable, especially for hardware devices specifically designed to be adapted, such as through software configurations and programming. Many commercial-grade bridges and/or wireless access points may be so configured/adapted.

Figure 3A:
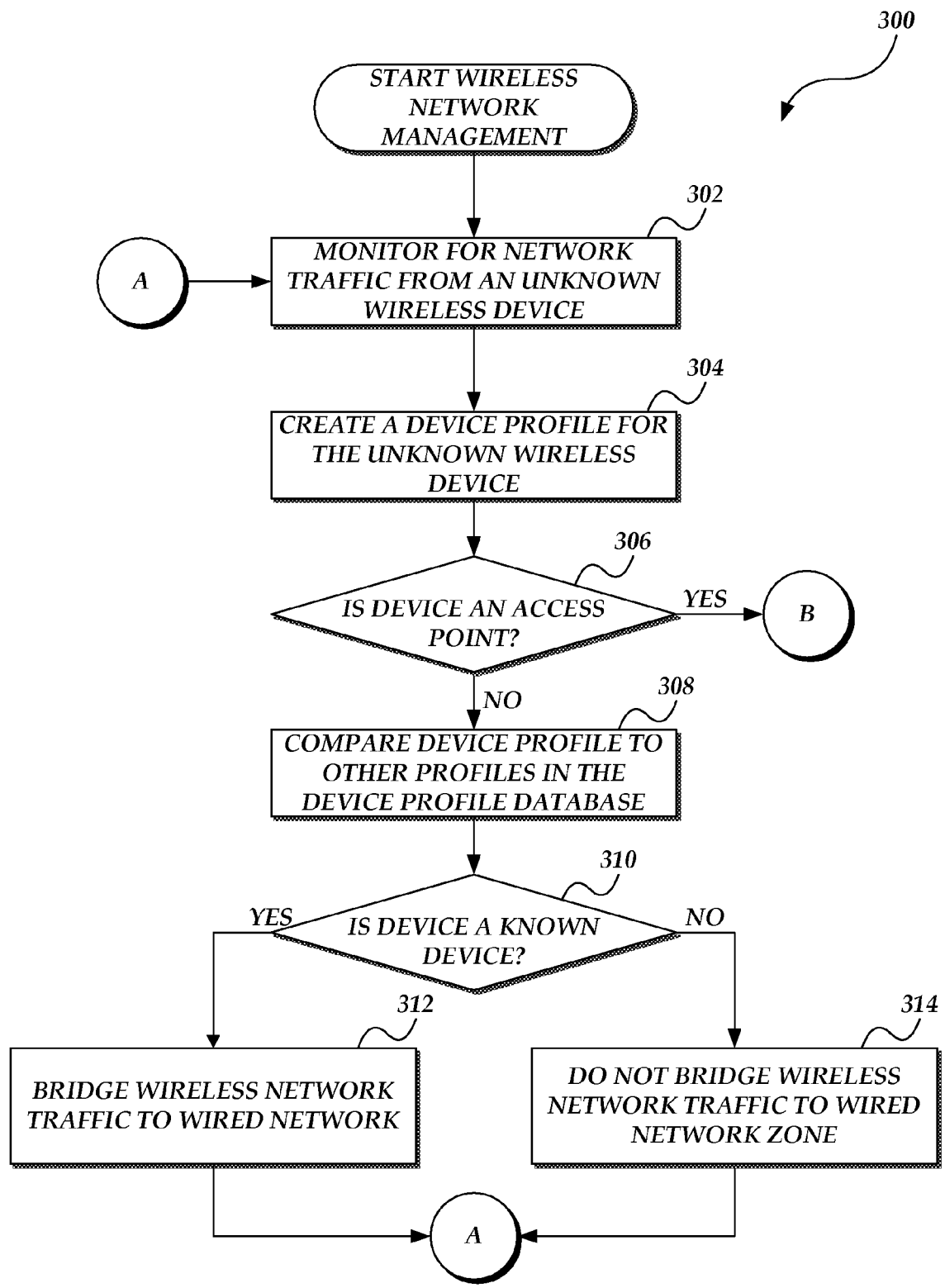
FIGS. 3A and 3B are flow diagrams illustrating an exemplary routine for performing network management in accordance with the present invention.
Figure 3B:
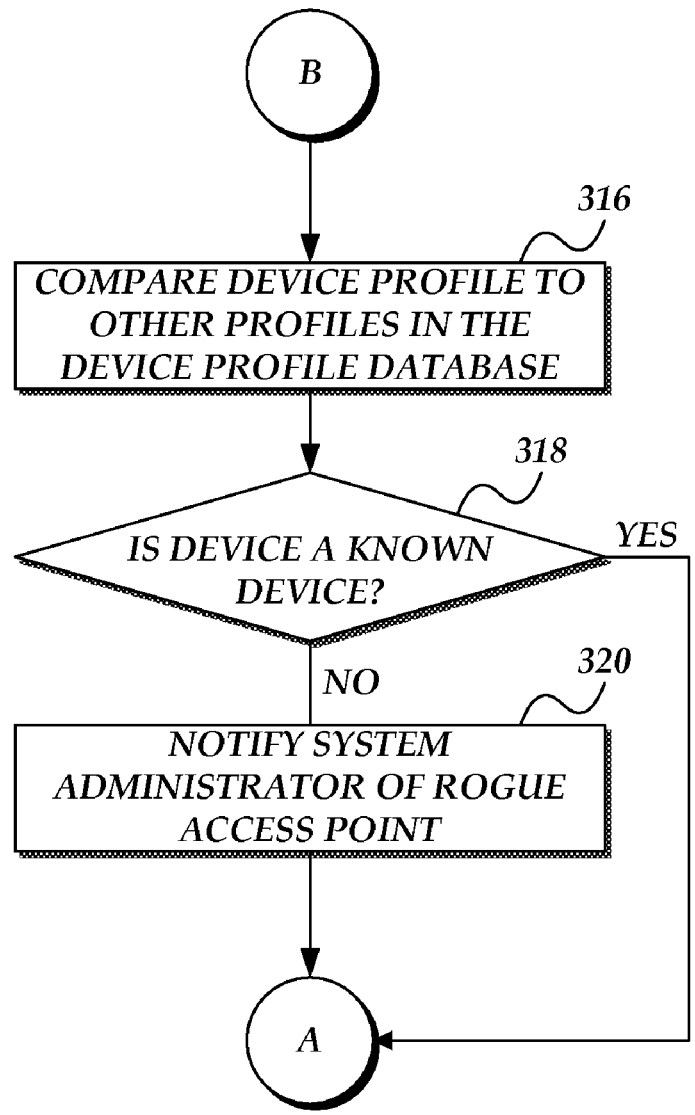

FIGS. 3A and 3B are flow diagrams illustrating an exemplary routine 300 for performing network management, in accordance with the present invention. This exemplary routine identifies general operations of the wireless security component 202. Beginning at block 302, the wireless security component 202 begins to passively monitor for network traffic from an unknown wireless device, such as wireless computing devices, as well as wireless access points. In contrast to some network device identification systems and techniques, passively monitoring for wireless network activity implies that the wireless security component 202 does not cause any network traffic to occur. Instead, the wireless security component 202 monitors that traffic that occurs because of typical network communications, i.e., it passively monitors the traffic.

At block 304, after having detected network traffic from an unknown wireless device, a device profile is generated for the device. As will be described in greater detail below, the device profile is based on identifying characteristics demonstrated as a result of the wireless security component 202 querying the unknown wireless device using standard communication/networking protocols, such as transmission control protocol/Internet protocol ("TCP/IP") commands, simple network management protocol commands ("SNMP"), and the like.

After creating the device profile for the unknown wireless device, at decision block 306, a determination is made as to whether the device is a wireless access point. This information may be determined according to the media access control ("MAC") address, or address range, of the unknown wireless device, the operating system, device type, or other identifying characteristics obtained in creating the device profile. Determining whether the unknown wireless device is, or may be, a wireless access point is significant to network management. In contrast to detecting intrusions from unknown wireless computing devices, an unauthorized, or rogue, wireless access point opens the computing network 200 to any number of potentially unauthorized wireless devices, and typically will not have the proper controls in place to secure the network, or operate with the wireless security component 202. It should be noted that not all wireless access points can be positively identified as a wireless access point using the device profile. When this occurs, it is beneficial to treat the unknown wireless device as both a wireless access point, and as another type of wireless device, such as a wireless computing device. In this case, both threads from decision block 306 should be followed.

If the unknown wireless device is determined to not be a wireless access point, at block 308, the device profile of the unknown wireless device is compared to known device profiles in a device profile database. At decision block 310, a determination is made as to whether the device is a known device, i.e., registered and authorized to access the computer network 200, or not. If the device is a "known" wireless device, at block 312, the wireless security component 202 bridges the network traffic to the wired network zone 110. Alternatively, at block 314, if the unknown wireless device is determined to not be a "known" wireless device, the wireless security component 202 refuses to bridge the network traffic to the wired network zone 110, thus preventing the network traffic from the unknown wireless device from further flowing in the computer network 200. Thereafter, the routine 300 returns again to block 302 to continue monitoring for network traffic from other unknown wireless devices. According to one embodiment of the invention, termination of this routine 300 is performed by a system administrator command to terminate (not shown.)

If the unknown wireless device is determined to be, or may be, a wireless access point, at block 316 (FIG. 3B), the device profile of the unknown wireless access point is compared to known device profiles in a device profile database. At decision block 318, a determination is made as to whether the unknown wireless access point is a known device, i.e., whether the device profile matches an existing device profile in the device profile database. If the wireless access point is a "known" device, the process returns again to block 302 to continue monitoring for additional wireless network activity. Alternatively, if the wireless access point is not a "known" device, at block 318, an alert is generated, such as a message sent to the system administrator advising that a rogue wireless access point has been established on the computer network 200. Alternatively, the alert may be a message sent to a pager number. Those skilled in the art will recognize that many different actions may be executed as an alert, and the above examples should be seen as illustrative, and not construed as limiting upon the present invention. Thereafter, the routine 300 returns to block 302 for further monitoring and processing.

According to one embodiment of the present invention, the wireless security component 202 comprises three key components. FIG. 4 is a block diagram illustrating these components of the wireless security component 202, in accordance aspects of the present invention. As shown in FIG. 4, the wireless security component 202 includes a control module 402, a bridge/probe module 404, and an administrative module 406. It should be understood that these components are all logical components. Thus, these components may reside on any device within the computer network 200 (FIG. 2), such as on the mini-computer 112 or the workstation 114. Additionally, as these are logical components, any of the control module 402, bridge/probe module 404, or administrative module 406 may be implemented as a collection of cooperative subcomponents, and may be distributed among multiple computing devices within the computer network 200. Alternatively these components may all be located on the same computing device. Therefore, the present invention may be implemented and deployed on any number of computer network configurations, and the present invention should not be construed as limited to any particular arrangement of specific components, computers, or network configurations.

As will be described in greater detail below, the control module 402 functions as a repository of security information, and provides certain security services for the secured computer network 200. The control module 402 maintains device identification information, log and journal files, and operating rules that are used to secure the computer network's interactions from unknown/unauthorized wireless devices, both wireless access points and wireless computing devices, in a wireless network zone 130.

The bridge/probe module 404 performs two general functions within the secured computer network 200. First, the bridge/probe module 404 controls the bridging, i.e., transfer, of network frame packets between the wired network zone 110 and the wireless network zone 130. Second, the bridge/probe module 404 performs a probing function that is used to establish a device profile, or fingerprint, for wireless devices, including both wireless access points and wireless computing devices, connected to the network 200. A more detailed description of the bridge/probe module is provided below.

The administrative module 406 functions to provide a system administrator with a real-time view of what is occurring within the computer network 200, and particularly in regard to wireless network activity. It is through the administrative module 406 that a system administrator may, for example, configure aspects of the wireless security component 202, initiate wireless device probes, and receive warnings regarding unauthorized wireless devices.

Figure 5:
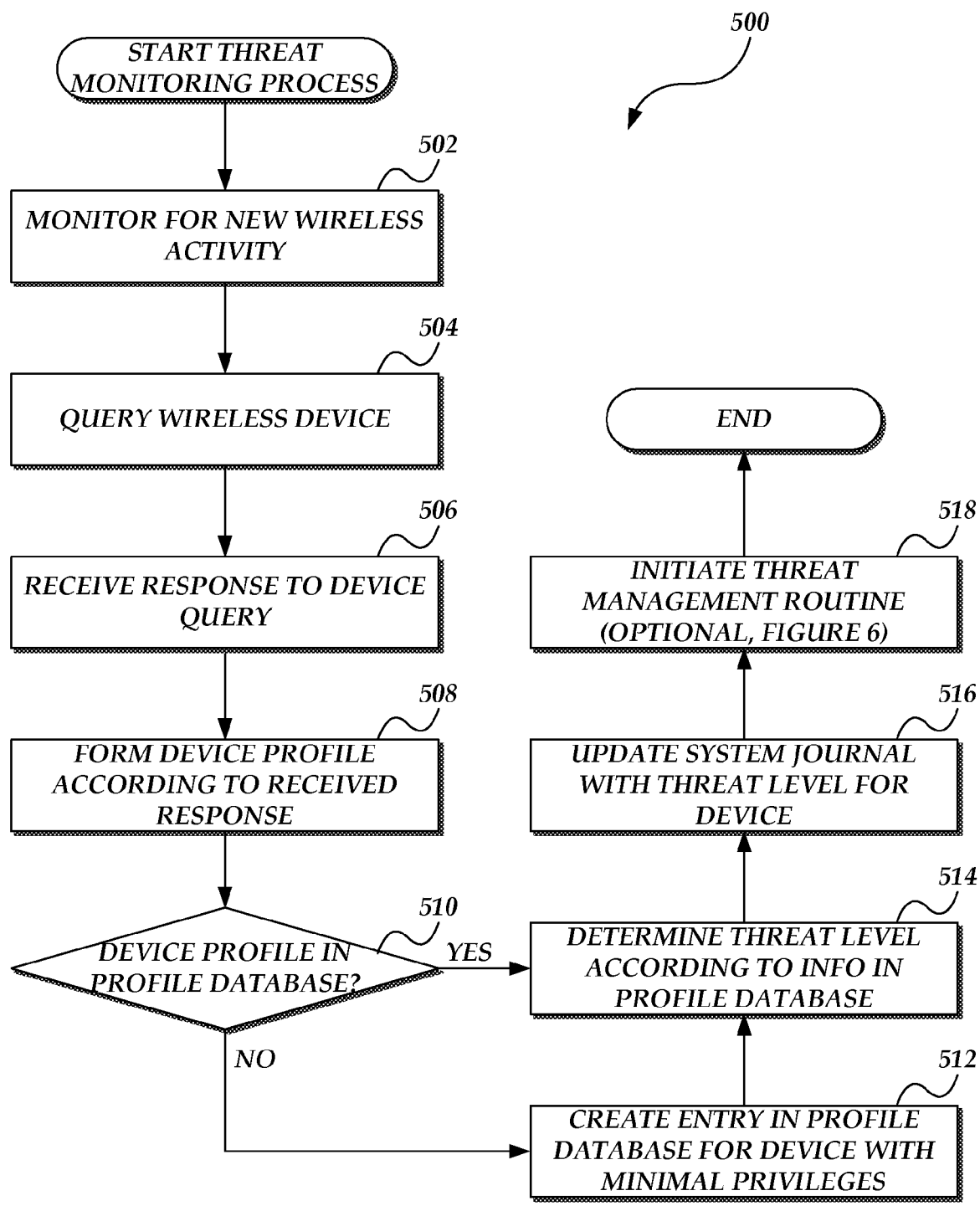
FIG. 5 is a flow diagram illustrating an exemplary routine for passively monitoring for wireless device threats on the network.

Through the cooperation of the modules described above, the wireless security component 202 is able to efficiently manage threats posed by unauthorized wireless network devices in a passive manner. FIG. 5 is a flow diagram illustrating an exemplary routine 500 for passively monitoring for wireless device threats on the network. Beginning at block 502, the wireless security component 202 begins to passively monitor for new wireless device activity. For purposes of the present discussion, passively monitoring for wireless device activity means that the wireless security component 202 examines network traffic, or frames, as they are transmitted by the various devices on the computer network 200 in their normal course of operation. This passive monitoring is in contrast to actively, and indiscriminately, causing network devices to transmit information, and then examining the resultant traffic for any wireless devices. By passively monitoring for network traffic from unknown wireless devices, the overall system performance of the computer network 200 is not adversely impacted.

Upon detecting activity from a wireless device that was not previously active, at block 504, i.e., queries are sent to the unknown wireless device, using standard network protocols and queries, requesting information from the unknown wireless device. For example, a query may request the wireless device's operating system, MAC address or address range, TCP/IP address or address range. Additionally, the query may be in the form of a TCP/IP request, or an SNMP request. It should be understood that these queries/requests are examples only, and should not be construed as limiting on the present invention.

At block 506, the responses from the wireless device are received. At block 508, information contained in the responses is collected and analyzed, from which a device profile that attempts to uniquely identify the unknown wireless device is generated. While the illustrative routine 500 shows that only one query is sent, this is for illustration purposes, and should not be construed as limiting upon the present invention. The queries are designed to elicit responses from the unknown wireless device which can be used to uniquely identify the unknown wireless device based on identifying characteristics in the response. Thus, according to one embodiment, multiple queries are sent to the wireless device in order to determine the unique device profile. Further, based on the response from a first query, a second query is determined and sent. For example, based on a response to a request for the operating system, a specific request known to be supported by the reported operating system may follow. This process of determining a unique device profile is referred to as probing the device.

While probing an unknown wireless device cannot strictly be viewed as an entirely passive process, it should be understood that, in contrast to indiscriminately requesting device information from the entire network, and filtering information from the resulting responses, probing is specific to, and directed at, a particular wireless device, and efficiently queries the device to determine the unique device profile. Thus, very little actual network traffic is generated by a probe, and the actual impact on the computer network is negligible.

After determining the device profile for the wireless device, at decision block 510, the device profile is compared to known device profiles in a device profile database to determine if the wireless device has already been recognized. If the unknown wireless device is new to the system, at block 512, an entry is created in the device profile database, and if appropriate, given certain network privileges according to predetermined criteria. For example, if a wireless access point, of a particular type and model, is detected, it may be given certain network privileges because that device is commonly used within the network. Alternatively, if a wireless device is identified as a new network printer, that printer may be given full access privileges accorded to such printer as printers are generally viewed as non-threatening. Still further, if an unknown wireless computing device is detected, it may be given sufficient privileges such that it may further identify itself as an authorized device within the network.

If the wireless device already has a profile within the profile database, or after an entry has been created for the wireless device, at block 514, a threat level is determined according to the activities exhibited by the wireless device, in accordance with any privileges associated with the wireless device's profile. For example, if the wireless device is requesting access to certain areas of the computer network 200 that have not been previously accessed by the unknown device, a threat level may be raised to a predetermined threshold. Alternatively, if an unknown wireless device comes within the range of a wireless access point and merely identifies itself, which may be quite common in office buildings shared by more than one company, a predetermined threat level for such interaction may be determined.

At block 516, a system journal is updated with the threat level for the unknown wireless device. Optionally, at block 518, a threat management routine is initiated to handle the threat established for the unknown wireless device. For example, while the above-mentioned threat management routine may execute at given intervals, if a given threat threshold is established for the unknown wireless device, the routine 500 may cause the above-mentioned threat management routine to execute immediately. An exemplary threat management routine is described below in regard to FIG. 6. Additionally, or alternatively, (not shown) a warning message may be sent to the system administrator via the administrator console 406, advising the system administrator of the detected threat. Thereafter, the routine 500 terminates.

Figure 6:
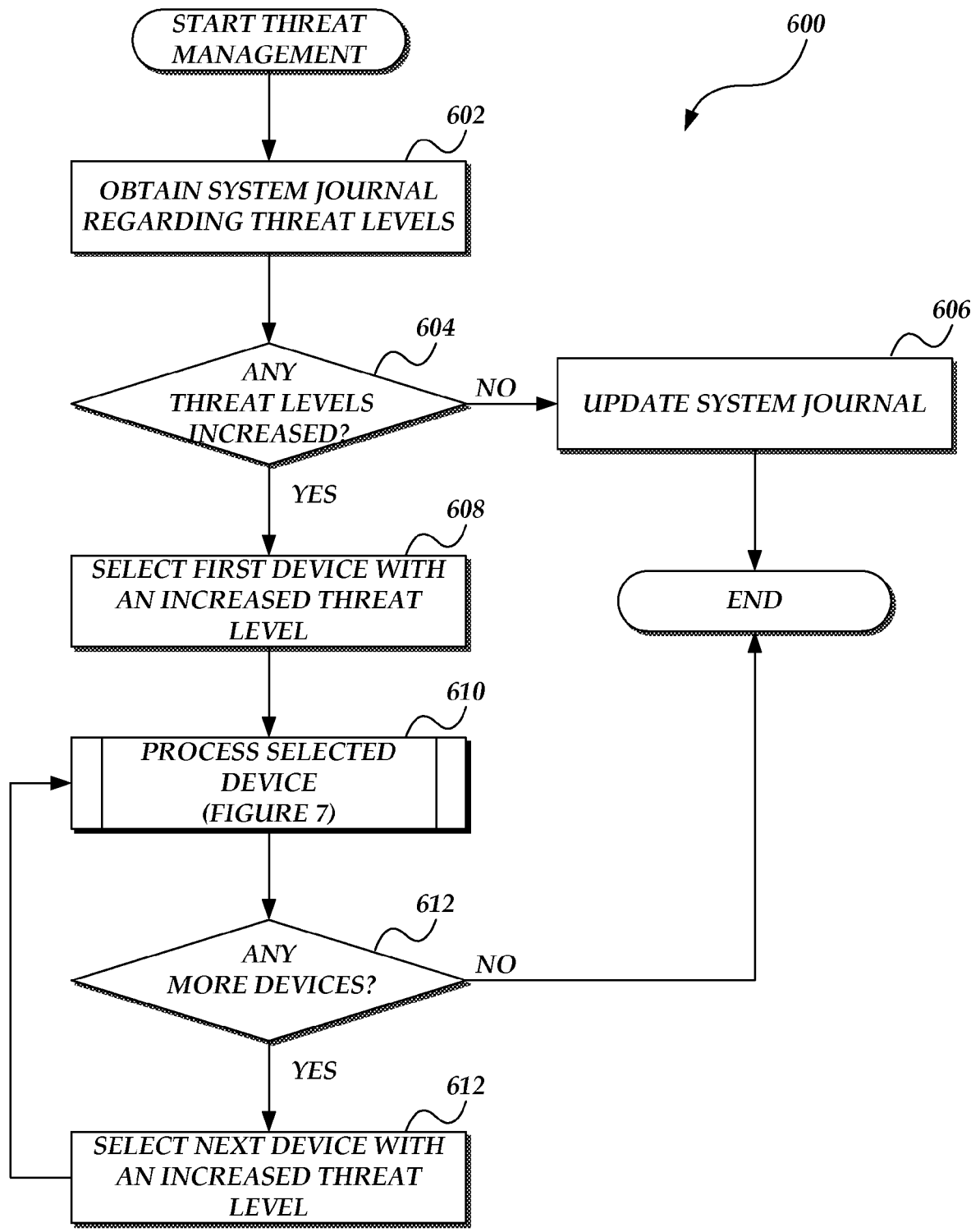
FIG. 6 is a flow diagram illustrating an exemplary routine for managing the information generated by the monitoring routine of FIG. 5.

FIG. 6 is a flow diagram illustrating an exemplary routine 600 for handling the threat information generated by the monitoring routine 500 of FIG. 5. As previously discussed, this exemplary threat management routine 600 operates cooperatively with the monitoring routine 500. According to aspects of the present invention, the routine 600 may be initiated directly by the threat monitoring routine 500, by a system administrator, on a timed basis, according to some specified event, and the like.

Beginning at block 602, the system journal mentioned above that includes threat levels posed by wireless devices is obtained. At decision block 604, current threat levels are compared to previous threat levels to determine if any threat levels have increased. According to aspects of the invention, because newly unknown detected wireless devices will not have a corresponding previous threat level in the system journal, the associated threat level is considered to be an increased threat level. If there are no increases in threat levels, at block 606, the system journal is updated to reflect this inaction, and the routine terminates.

Alternatively, if there are increased threat levels, at block 608, the first wireless device exhibiting an increased threat level is selected. At block 610, the threat level associated with the selected wireless device is processed. Processing a threat level posed by a wireless device is described below in regard to FIG. 7.

Figure 7:
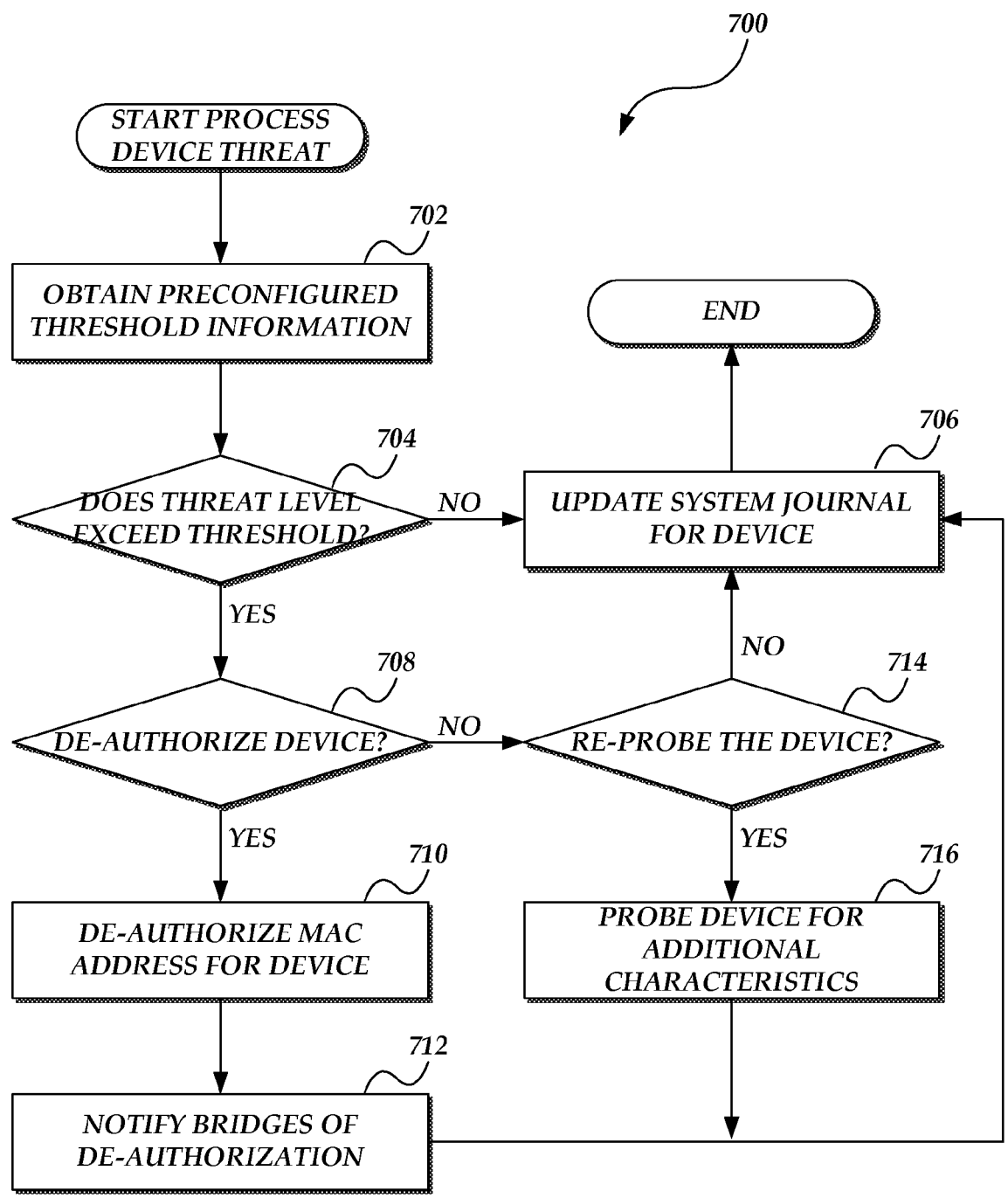
FIG. 7 is a flow diagram illustrating an exemplary sub-routine for processing a detected wireless threat as called by the management routine of FIG. 6.

FIG. 7 is a flow diagram illustrating an exemplary subroutine 700 for processing a threat posed by a wireless device, suitable for use by the management routine 600 of FIG. 6. Beginning at block 702, information regarding actions to be taken when wireless devices pose a particular threshold is retrieved. As previously indicated, these thresholds may be based on a variety of criteria and recommend numerous actions to be taken. For example, when an unauthorized/unknown wireless computing device comes within range of an authorized wireless access point, the computing device will identify itself to the wireless access point. This may merit a minimal, or low, threat level and no action is required. However, if that same unknown wireless computing device attempts thereafter to access files within the network, the threat level may then be raised to a very high level, and exceeding a predetermined threshold, appropriate blocking actions may be taken. In this fashion, the present invention may be thought of as a just-in-time security system. Alternatively, if a printer is connected to the network over a wireless connection, a minimal threat level is established and no action is required. As yet a further alternative, if a new wireless access point is detected, this may merit an immediate high threat level due to the enhanced security risks posed from other unknown wireless devices, and, exceeding a predetermined threshold, a high priority warning message is sent to the system administrator to take appropriate action.

At decision block 704, a determination is made as to whether the threat level associated with the wireless device has exceeded a predetermined threshold such that some action must be taken. If the threshold is not exceeded, at block 706 the system journal is updated to reflect the current threshold level of the wireless device, and the routine 700 terminates.

If the wireless device exceeds a predetermined threshold, a determination is made as to whether the device should be de-authorized. De-authorizing a wireless device means that the device should no longer simply be watched, but instead should no longer be tolerated within the computer network 200. For example, if the unknown wireless device is a wireless computing device, the bridge/probe module 404 may be advised of the de-authorization, and refuse to bridge network traffic from the device to the wired network zone 110. Bridging network traffic between the wired network zone 110 and the wireless network zone 130 is described below in regard to FIG. 8.

If it is determined that the wireless device should be de-authorized, at block 710, the device profile for the unknown wireless device in the device profile database is updated as de-authorized. This information may be based on the MAC address for the wireless. At block 712, notifications are made to the bridge/probe modules 404 in the computer network 200 indicating that they should no longer bridge network traffic from that device. Thereafter, at block 706, the system journal is updated, and the routine 700 terminates.

Alternatively, if the device is not to be de-authorized, at decision block 714, a determination is made as to whether there should be an additional probe made on the device. This additional probe may be made to further determine the identity of the device, or specific details that may be subsequently used in evaluating the threat level posed. If no additional probe is required, at block 706, the system journal is updated, and the routine 700 terminates. However, if an additional probe would be appropriate, at block 716, the wireless device is again probed for its unique characteristics, which are recorded with its device profile in the device profile database. Thereafter, at block 706, the system journal is updated, and the routine 700 terminates.

Returning again to FIG. 6, after processing the threat level posed by the selected unknown wireless device, at decision block 610, a subsequent determination is made as to whether there are any additional unknown wireless devices that have an associated increased threat level. If there are more such devices, at block 612, the next unknown wireless device with an increased threat level is selected, and the routine 600 returns to block 608 to process the threat level posed by the selected device. This continues, until, at decision block 610, there are no additional unknown wireless devices that have an associated increased threat level to be processed, whereupon, the routine 600 terminates.

Figure 8:
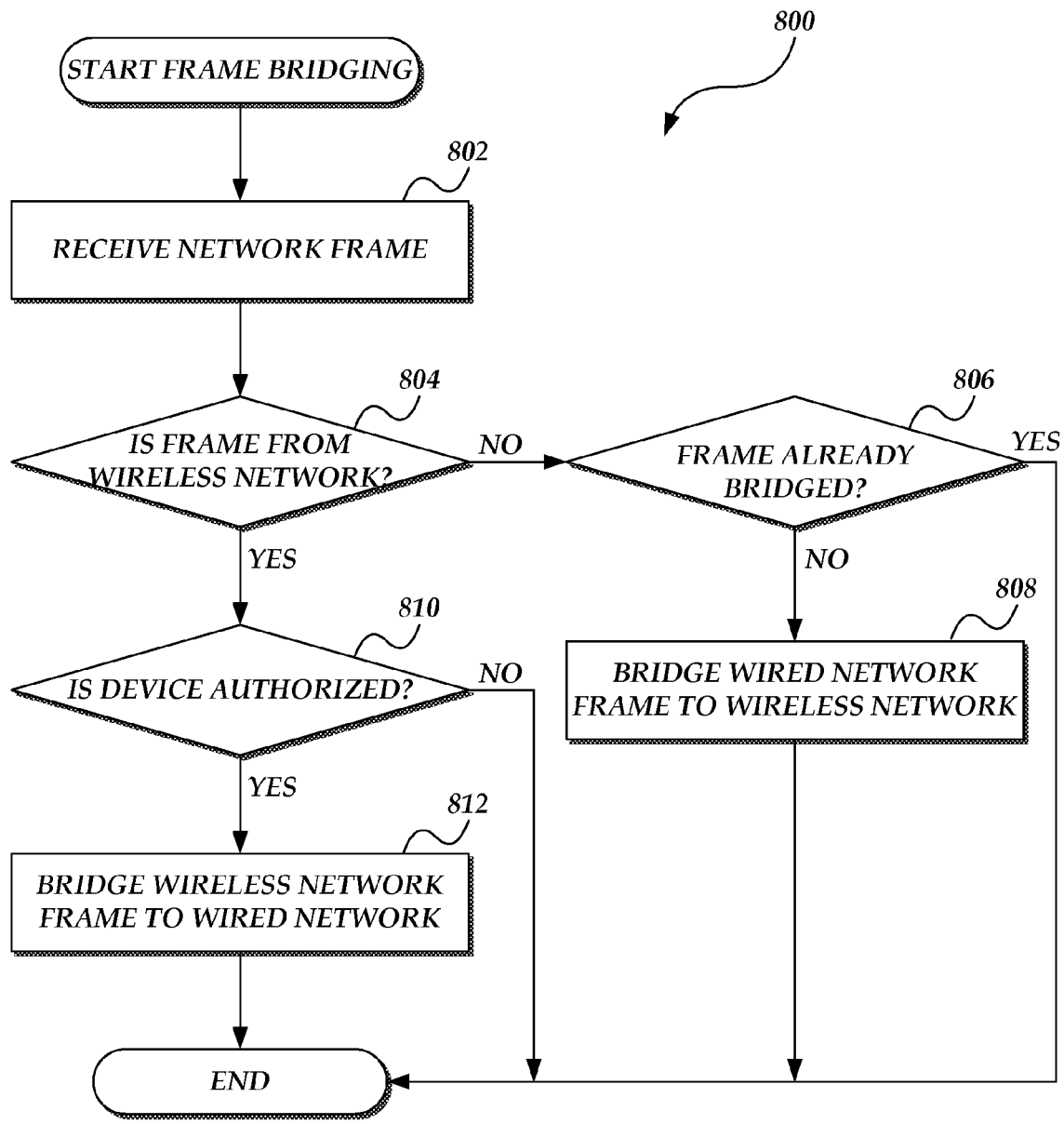
FIG. 8 is a flow diagram illustrating the exemplary routine for bridging network traffic between wireless and wired network zones, in accordance with the present invention.

FIG. 8 is a flow diagram illustrating the exemplary routine 800 for bridging network traffic between wireless and wired network zones, in accordance with the present invention. This routine 800 will typically be executed by the bridge/probe module 406 of the wireless security component 202, and represents a key function for controlling network traffic from wireless computing devices.

Beginning at block 802, a network frame, i.e., a packet of information, from a computer network device to be delivered over the network 200, is received. At decision block 804, a determination is made as to whether this network frame is from an unknown wireless device. Thus, it is assumed that traffic originating from within the wired network zone 110 is secure, and only traffic entering from the wireless network zone 130 must be examined. If the network frame is not from an unknown wireless device, at decision block 806, a further determination is made as to whether the network frame has already been bridged, i.e., delivered to its destination in the wireless network zone 130. If the network frame has not already been bridged, at block 808, the bridge/probe module 406 bridges the network frame to the wireless network zone 130. Alternatively, if the network frame has already been bridged, or after bridging the network frame, the routine terminates.

If the network frame is from a wireless network zone 130, at decision block 810, a determination is made as to whether the network frame is from a wireless device that is authorized to transmit information to the wired network zone 110, or conversely, from a wireless device that has been de-authorized to transmit information to the wired network zone 110. If the wireless device is authorized, or rather not de-authorized, at block 812, the bridge/probe module 404 bridges the network packet to the wired network zone 110. However, if the wireless device is not authorized, i.e., the wireless device is de-authorized, the bridge/probe module 404 refuses to bridge the network packet to the wired network zone 110. Thereafter, the routine 800 terminates.

According to aspects of the present invention, the wireless security component 202, and its functions, such as those described above, are implemented using cooperative modules located within the computer network 200. The following discussion is presented to further describe the operations of the various cooperative modules.

Figure 9:
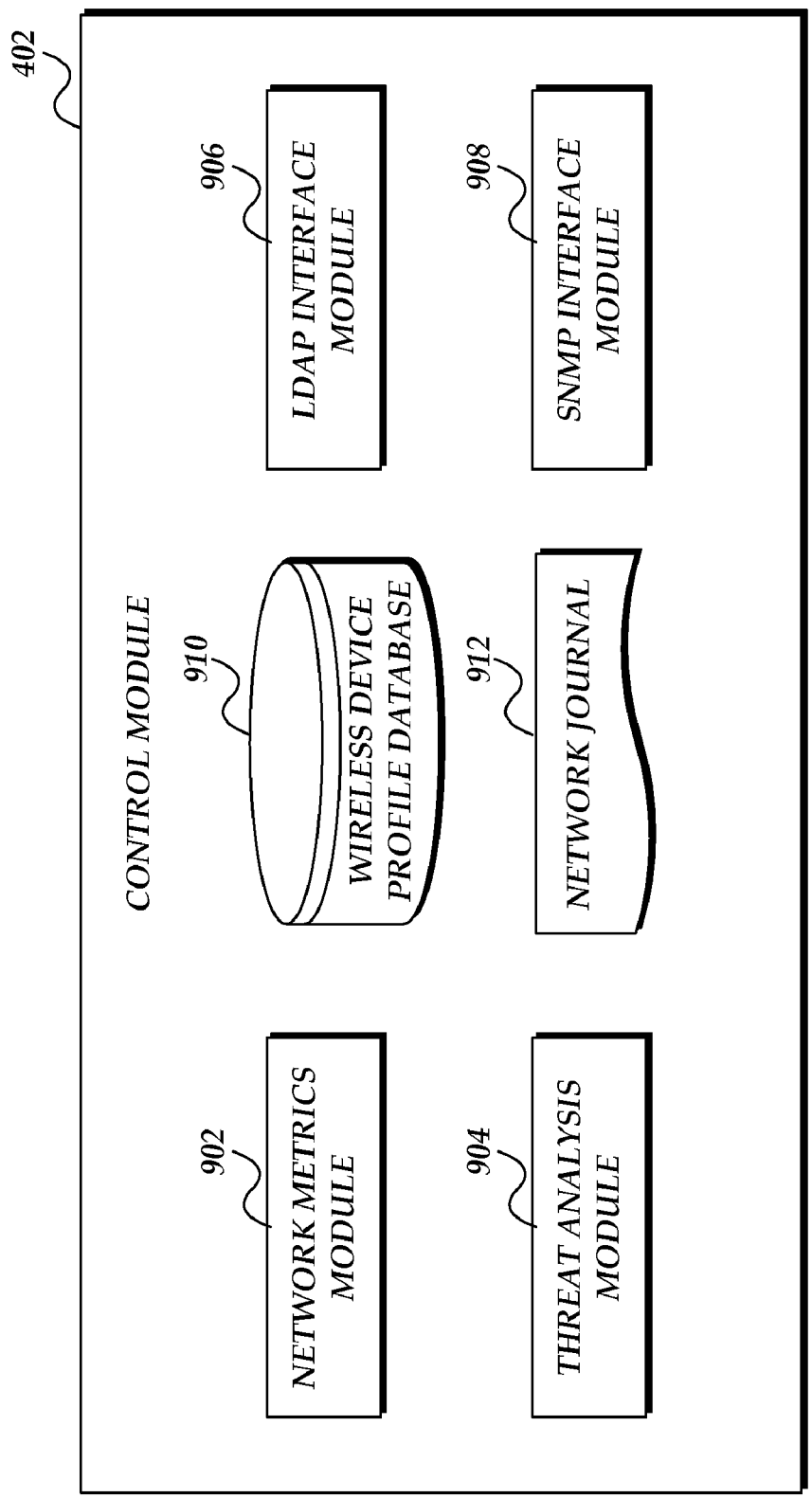
FIG. 9 is a block diagram illustrating exemplary sub-components of the control module in accordance with the present invention.

FIG. 9 is a block diagram illustrating exemplary sub-components of the control module 202 in accordance with the present invention. As previously discussed, the control module 402 functions as a repository of security information, and provides certain security services for the secured computer network 200. Additionally, the control module 402 provides the device identification and threat analysis described above in regard to FIGS. 5, 6, and 7, as well as other functions to control access to the wired network zone 110. According to one embodiment, due to the nature of the services provided by the control module 402, the control module usually resides by itself on one of the computers or workstations within the wired network zone 110, such as the mini-computer 112 or workstation 114.

As illustrated in FIG. 9, an exemplary control module 402 may be comprised of various sub-modules to perform the functions of a control module. As illustrated, an exemplary control module 402 includes a network metrics module 902, a threat analysis module 904, an LDAP interface module 910, and an SNMP interface module 908. The control module 402 also includes, or maintains, a wireless device profile database 901 in which the device profiles for wireless devices are stored, and a network journal 914 for recording network events, threat levels, and the like.

The network metrics module 902 performs those functions, described above, to collect and store computer network information. In particular, one key function performed by the network metrics module 902 is to gather and maintain wireless device information for both wireless access points and wireless computing devices. For each known wireless device, a set of device metrics, referred to as a device profile, is collected and stored in the device profile database 910. As described above, the device profiles are used to distinguish between authorized and unauthorized wireless devices.

In regard to wireless computing devices, the network metrics module 902 causes standard device protocol commands to be issued to a wireless computing device, via the bridge/probe module 404, in order to collect identifying characteristics of that wireless device. Responses received from the wireless computing device form that device's profile, which may then be stored in the wireless device profile database 910. As mentioned above, initial protocol commands are issued to a wireless device that are general in nature. They include hardware characteristics, such as the wireless computing device's MAC address, and software characteristics, such as the wireless computing device's operating system (e.g., Linux, Solaris, Windows®, Palm/OS, and the like). The responses to these general commands are analyzed and used to determine what additional commands may be issued to the wireless device in order to further discover additional information, such as other hardware identifiers, file names and structures, all of which are used to form a device profile for that wireless computing device. Information, such as access permissions and privileges, may be associated with a device profile. Thus, the device profile is referred to when that same wireless computing device subsequently connects to a secured computer network 200.

In regard to wireless access points, the network metrics module 902 issues device protocol commands to a wireless access point to which the wireless access point is most likely to respond. For example, the network metrics module 902 may issue SNMP commands, MAC address queries in known address ranges, and TCP/IP commands in known address ranges, all to prompt the wireless access point to respond. As a wireless access point responds, device characteristics of the wireless access point are used to form a device profile that can be compared against device profiles of known/authorized wireless access points in the wireless device profile database 910. If no match is found, the wireless access point may be considered an unauthorized, or a rogue, wireless access point, and a system administrator can be notified.

The threat analysis module 904 uses information in the wireless device profile database 910, as well as other system configuration information, to determine a threat level posed by the unidentified wireless computing device. This threat level may be based on the activity of the unidentified wireless computing device, or upon the type of wireless device. For example, threat levels can range from very low for an unidentified wireless computing device that has simply passed within range of one of the secure computer network's wireless access points, to very high if the device is making connection attempts using components of another, identified/authorized wireless computing device's identification, such as MAC address. In response to a perceived threat, the threat analysis module 904 may issue commands to deny the unidentified wireless computing device access to areas in the secure computing network 200. According to one embodiment, if the threat level for an unidentified wireless computing device exceeds a predetermined threshold, the threat analysis module 904 issues these commands to deny the unidentified wireless computing device access to areas in the secure computing network 200.

The LDAP interface module 906 provides the interface to the wired network zone's LDAP directory. The control module 402 uses device profiles obtained by the network metrics module 902 to query the wired network zone's LDAP directory in order to determine the identity of a user of a particular wireless computing device. This information is requested from and relayed to the administrative module 406 for system administrator purposes. Accordingly, information displayed by the administrative module 406 may include details regarding the individual using a specific wireless computing device, such as the user's name, department, phone number, etc.

The control server 402 also includes an SNMP interface module 908. The SNMP interface module 908 allows the secured computer network 200 to participate as an SNMP network, responding to queries from external systems and/or networks, such as OpenView and the like.

With reference again to FIG. 4 and the bridge/probe module 404 described above, the bridge/probe module acts as a "smart bridge" that bridges information from a wireless network zone 130 to a wired network zone 110 according to whether the originating wireless device is an authorized or de-authorized wireless device, such as described above in regard to FIG. 8. The bridge/probe module obtains this authorization information from the wireless device profile database 910 and/or the threat analysis module 904 of the control module 402. According to aspects of the present invention, communication among the various modules of the wireless security component 202 are in an extensible markup language ("XML") format for each of maintenance, compatibility, and integration with external devices and processes.

In addition to allowing, or disallowing, network traffic to flow to the wired network zone 110, the bridge/probe module 404 analyzes the network traffic traveling between the wireless and wired network zones, summarizes the analysis, and forwards it to the administrator module 406 for system administrator purposes. Types of information collected from wireless devices and wireless access points include gateway and DHCP server location, hardware manufacturer, and the like.

In addition to the bridging functionality previously described, the bridge/probe module 404 also operates to discover wireless access points, in particular, unauthorized wireless access points. According to one embodiment of the present invention, the bridge/probe module 404 inspects each network frame that passed through it for characteristics that may indicate the frame originates from a wireless access point. These characteristics may include the transmission of SNMP data, specific protocol sequences, and a frame from a particular MAC address range used by known wireless access points. By matching the characteristics of a frame to an entry in a list of characteristics of known wireless access points, a wireless access point is "found." According to one embodiment, the bridge/probe module 404 maintains a list/database of authorized wireless access points, and upon discovering a wireless access point, the bridge/probe module 404 determines if the wireless access point is authorized. If it is, no further action is taken. Alternatively, if it is not an authorized wireless access point, the wireless access point is considered a rogue wireless access point, and the bridge/probe module 404 notifies the administrative console 406 for further action. Additionally, there are times when a "found" wireless access point cannot be conclusively determined to be a wireless access point. In these cases, when a found wireless access point is discovered, the system administrator is notified to take further, manual action. According to yet a further embodiment, the bridge/probe module 404 may be directed to actively probe for wireless access points by broadcasting requests on the computer network 200 that cause network devices to respond.

The administrative module 406 typically operates within the wired network area 110, and also typically resides on its own hardware device. The administrative module 406 provides a system administrator with a real-time view of what is occurring within the computer network 200, and in particular, the wireless network zone 130. According to one embodiment of the present invention, the administrative module 406 displays information about wireless devices detected in the computer network 200. This information display may include information regarding both authorized and unauthorized devices, color-coded according to threat level. The device information may include MAC address, IP address, device type, user name, and the like. The administrative module 406 may permit a system administrator to select a device from the displayed list and show further detailed information, such as network access attempts, in real-time.

The administrative module 406 is the system administrator's communication channel with the wireless security component 202. Accordingly, the administrative module 406 communicates with the other modules, such as the control module 402 and the bridge/probe module 404, to relay alert messages to the system administrator when certain predefined conditions are detected. Conversely, the system administrator may initiate wireless device probes, threat analysis processes, and the like, from the administrative console 406. The administrative console 406 may also be used for system installation, configuration, and updates.

While illustrative embodiments have been illustrated and described, it will be appreciated that various changes can be made therein without departing from the spirit and scope of the invention.

The invention claimed is:

1. A computer-implemented method for securing a computer network comprising a wired and wireless portion, the method comprising:
    providing a security component within a wired portion of the computer network, wherein the security component is configured to control the bridging of network activity between the wireless portion and wired portion of the computer network; and
    through the security component:
        passively monitoring for network traffic between the wireless and wired portions of the computer network for unknown wireless devices;
        detecting network traffic between the wireless and wired portions of the computer network for an unknown wireless device;
        determining at least one identifying characteristic of the unknown wireless device by actively probing the unknown wireless device for an identifying characteristic;
        determining at least one behavioral characteristic of the unknown wireless device according to the network traffic between the unknown wireless device and devices in the wired portion of the computer network;
        generating a device profile of the unknown wireless device according to the at least one identifying characteristic and the at least one behavioral characteristic of the unknown wireless device;
        determining a set of access privileges corresponding to the unknown wireless device according to the device profile; and
        bridging network traffic between the unknown wireless device and devices in the wired portion of the computer network consistent with the determined access privileges.

2. A computer system providing improved security from unauthorized access by unknown wireless devices, the system comprising:
    a wired computer network having a plurality of wired network devices;
    a wireless access point attached to the wired computer network for enabling wireless devices to communicate with the computer network; and
    a security component configured to control the bridging of network traffic between wireless network devices operating through the wireless access point and the wired network devices in the computer network;
    wherein the security component, in bridging network traffic between the wireless network devices operating through the wireless access point and the wired network devices in the computer network, is further configured to:
        passively monitoring for network traffic from an unknown wireless device through the wireless access point;
        upon detecting network traffic from the unknown wireless device:
            probe the unknown wireless device to determine at least one characteristic of the wireless device;
            generate a device profile of the unknown wireless device according to the at least one determined characteristic;
            determine access privileges to give to the unknown wireless device according to the determined profile and the activities exhibited by the wireless device; and
            control the bridging of the network traffic between the wired network devices in the computer network according to the determined access privileges.

* * * * *